(12) United States Patent
Mori (10) Patent No.: US 12,322,950 B2
(45) Date of Patent: Jun. 3, 2025

(54) CONTROL APPARATUS AND SWITCHING APPARATUS FOR SHORT CIRCUIT PROTECTION

(71) Applicant: FUJI ELECTRIC CO., LTD., Kanagawa (JP)

(72) Inventor: Takahiro Mori, Matsumoto (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 368 days.

(21) Appl. No.: 17/747,980

(22) Filed: May 18, 2022

(65) Prior Publication Data

US 2023/0016546 A1 Jan. 19, 2023

(30) Foreign Application Priority Data

Jul. 15, 2021 (JP) ................................. 2021-117120

(51) Int. Cl.
| | |
|---|---|
| H02M 1/32 | (2007.01) |
| H02H 3/027 | (2006.01) |
| H02H 3/093 | (2006.01) |
| H02M 1/08 | (2006.01) |

(52) U.S. Cl.
CPC ............ *H02H 3/027* (2013.01); *H02H 3/093* (2013.01); *H02M 1/08* (2013.01); *H02M 1/32* (2013.01)

(58) Field of Classification Search
CPC .......... H02M 1/08; H02M 1/32; H02H 3/027; H02H 3/093
See application file for complete search history.

(56) References Cited

U.S. PATENT DOCUMENTS

| | | | |
|---|---|---|---|
| 2001/0026429 A1* | 10/2001 | Fukuda | ................ H03K 17/168 361/58 |
| 2011/0304941 A1 | 12/2011 | Tanimura | |
| 2017/0358982 A1* | 12/2017 | Nakamori | ............... H02M 1/08 |
| 2018/0316182 A1 | 11/2018 | Minagawa | |

(Continued)

FOREIGN PATENT DOCUMENTS

| | | | | |
|---|---|---|---|---|
| CN | 104170255 A | * | 11/2014 | ............. G01R 17/02 |
| JP | H114150 A | | 1/1999 | |
| JP | 2010034701 A | | 2/2010 | |

(Continued)

OTHER PUBLICATIONS

Office Action issued for counterpart Japanese Application No. 2021-117120, transmitted from the Japanese Patent Office on Mar. 11, 2025 (drafted on Mar. 3, 2025).

*Primary Examiner* — Jue Zhang
*Assistant Examiner* — Jye-June Lee (57) ABSTRACT

Provided is a control apparatus including a sensing unit configured to output a short circuit sensing signal in response to sensing, in a turn-on period of a main switching device by a switching device for on control, of short circuit of the main switching device, a protection operation control unit configured to output an instruction signal of a short circuit protection operation at delayed timing relative to the short circuit sensing signal, and a protection unit configured to turn off the switching device for on control in response to the instruction signal, in which the protection operation control unit outputs the instruction signal in response to continuation of the short circuit sensing signal beyond a first reference time period.

13 Claims, 4 Drawing Sheets

(56) References Cited

U.S. PATENT DOCUMENTS

2019/0140630 A1   5/2019  Chen
2019/0238123 A1*  8/2019  Yamanaka ............. H03K 17/18

FOREIGN PATENT DOCUMENTS

| JP | 2010062860 A | * | 3/2010 | |
|----|--------------|---|--------|---|
| JP | 2011259223 A |   | 12/2011 | |
| JP | 2013214875 A | * | 10/2013 | |
| JP | 2014117112 A |   | 6/2014 | |
| JP | 2018186691 A |   | 11/2018 | |
| JP | 2019134233 A | * | 8/2019 | ........... H02H 1/0007 |
| WO | WO-2014097485 A1 | * | 6/2014 | ............. H02H 3/093 |

* cited by examiner

CONTROL APPARATUS AND SWITCHING APPARATUS FOR SHORT CIRCUIT PROTECTION

The contents of the following Japanese patent application are incorporated herein by reference:
2021-117120 filed in JP on Jul. 15, 2021

BACKGROUND

1. Technical Field

The present invention relates to a control apparatus and a switching apparatus.

2. Related Art

Up to now, in a case where a device current flowing in a main switching device to be turned on by a switching device for on control transiently increases in a turn-on period and exceeds a short circuit threshold, the switching device for on control is put into an off state until the device current falls below the short circuit threshold (for example, see Patent Document 1).

[Patent Document 1] Japanese Patent Application Publication No. 2011-259223
[Patent Document 2] Japanese Patent Application Publication No. H11-4150

DESCRIPTION OF EXEMPLARY EMBODIMENTS

Hereinafter, the present invention will be described by way of embodiments of the invention, but the following embodiments are not intended to restrict the invention according to the claims. In addition, not all combinations of features described in the embodiments necessarily have to be essential to solving means of the invention.

1. First Embodiment

[1.1. Switching Apparatus 1]

Figure 1:
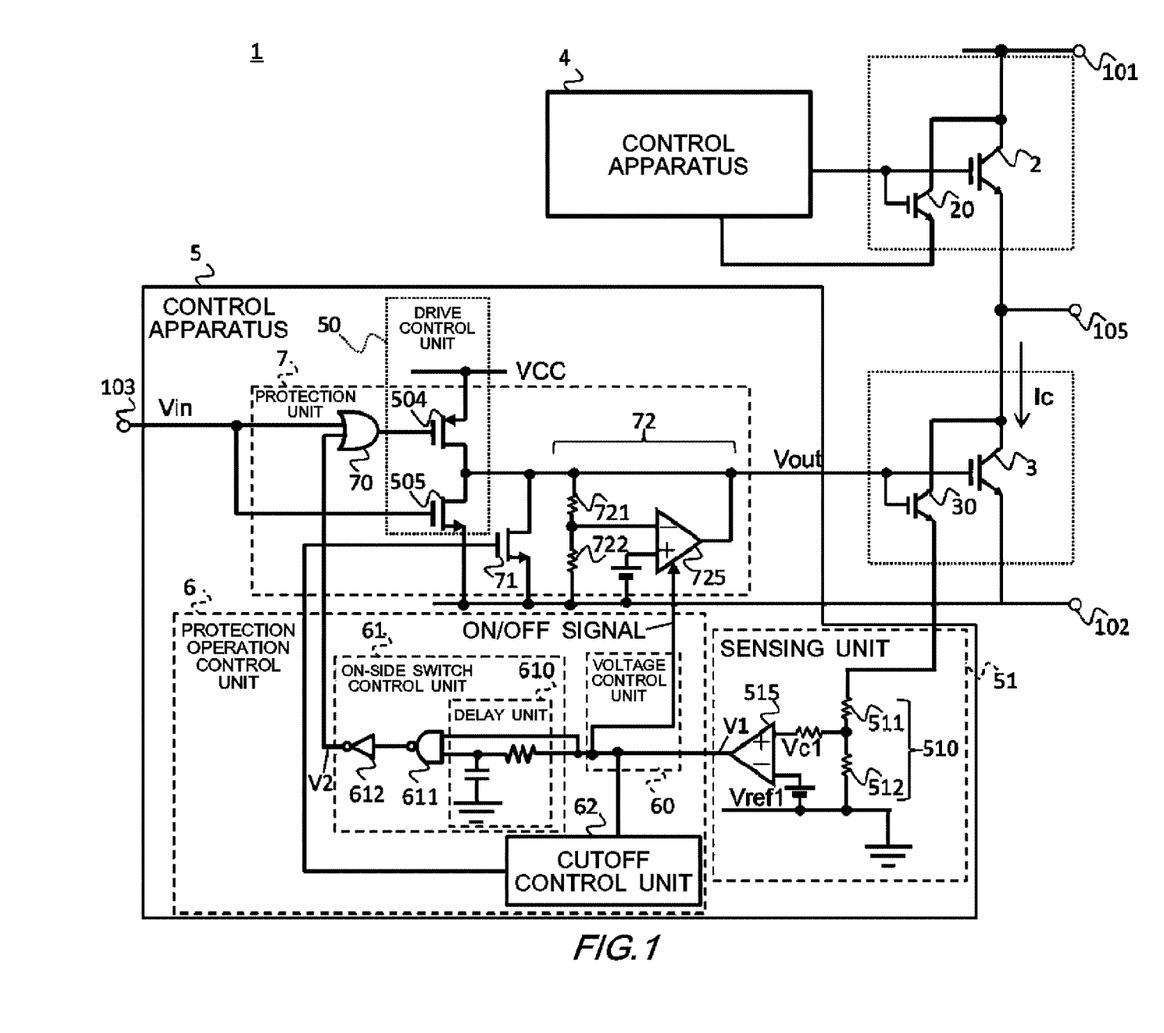
FIG. 1 illustrates a switching apparatus 1 according to a first embodiment.

FIG. 1 illustrates a switching apparatus 1 according to the present embodiment. The switching apparatus 1 may be an apparatus used for motor drive or power supply, and may be, for example, a power conversion apparatus such as an inverter apparatus configured to convert direct current power supplied from a positive terminal 101 and a negative terminal 102 into alternating current power to be output from a power supply output terminal 105. In addition, the switching apparatus 1 may be an intelligent power module (IPM) configured to automatically perform a protection operation when an abnormality occurs. The switching apparatus 1 may include main switching devices 2 and 3 on a positive side and a negative side, and control apparatuses 4 and 5 on the positive side and the negative side. It should be noted that as one example, the negative terminal 102 may be connected to a ground. In addition to the positive terminal 101, the negative terminal 102, and the power supply output terminal 105, an input terminal 103 to which a drive signal Vin is input and the like may be provided in the switching apparatus 1.

[1.1.1. Main Switching Devices 2 and 3]

The main switching devices 2 and 3 are sequentially connected in series between the positive terminal 101 and the negative terminal 102. For example, in each of the main switching devices 2 and 3, a collector terminal is connected on the positive terminal 101 side, and an emitter terminal is connected on the negative terminal 102 side. The main switching devices 2 and 3 may configure an upper arm and a lower arm in the switching apparatus, and the power supply output terminal 105 may be connected to a midpoint between the main switching device 2 and the main switching device 3.

Sense emitter terminals connected to corresponding control apparatuses 4 and 5 may be provided in the main switching devices 2 and 3. For example, switching devices 20 and 30 for current detection may be provided in parallel in the main switching devices 2 and 3. The emitter terminals of the switching devices 20 and 30 may be sense emitter terminals for the main switching devices 2 and 3, and may cause currents (also referred to as sense emitter currents) according to currents flowing in the main switching devices 2 and 3 to flow in the control apparatuses 4 and 5. It should be noted that according to the present embodiment, as one example, the main switching devices 2 and 3 may be an IGBT, and the switching devices 20 and 30 for current detection may be an IGBT smaller than the main switching devices 2 and 3. The switching devices 20 and 30 may be provided in a same chip as the main switching devices 2 and 3.

The main switching devices 2 and 3 may have a parasitic diode (not illustrated) with the positive terminal 101 side serving as a cathode. In addition to or instead of this, in each of the main switching devices 2 and 3, a freewheel diode (not illustrated) may be connected in anti parallel in such a way as to cause the positive terminal 101 side to serve as the cathode. The main switching devices 2 and 3 may also be a semiconductor device having other structures such as a MOSFET or a bipolar transistor.

[1.1.2. Control Apparatuses 4 and 5]

The control apparatuses 4 and 5 are configured to control the main switching devices 2 and 3. The control apparatus 4 on the positive side may set the main switching device 2 as the control target, and the control apparatus 5 on the negative side may set the main switching device 3 as the control target. It should be noted that since the control apparatuses 4 and 5 have a similar configuration, according to the present embodiment, the control apparatus 5 on the negative side will be described, and a description of the control apparatus 4 on the positive side will be omitted.

The control apparatus 5 is configured to control the main switching device 3. The control apparatus 5 has a drive control unit 50, a sensing unit 51, a protection operation control unit 6, and a protection unit 7.

[1.1.2(1). Drive Control Unit 50]

The drive control unit 50 is configured to perform drive control on the main switching device 3 according to the drive signal Vin. The drive signal Vin may be input to the control apparatus 5 from the outside via the input terminal 103. The drive signal Vin may include an on command signal for putting the main switching device 3 into an on state, and an off command signal for putting the main switching device 3 into an off state. For example, the drive signal Vin may cause the main switching devices 2 and 3 to perform switching by a synchronous rectification method, and as one example, may be set in such a way as to cause the main switching devices 2 and 3 to be alternatively (in one example, alternately) put into a connected state across a deadtime in which both the main switching devices 2 and 3 are turned off. The drive signal Vin may control the main switching devices 2 and 3 by PWM control. It should be noted that according to the present embodiment, as one example, the drive signal Vin instructs the main switching device 3 to be turned on in the case of a low level, and instructs the main switching device 3 to be turned off in the case of a high level. The drive control unit 50 has a switching device 504 and a switching device 505.

The switching device 504 is connected between a power source of a control voltage Vcc and a gate of the main switching device 3. The switching device 504 is a switching device for on control, and when the power source of the control voltage Vcc is electrically connected to the gate of the main switching device 3, an output signal Vout for a gate terminal of the main switching device 3 is set at the high level, and the main switching device 3 is turned on. The switching device 504 may be turned on when the drive signal Vin supplied via an OR gate 70 which will be described below in the protection unit 7 is at the low level. It should be noted that according to the present embodiment, as one example, the switching device 504 is a P type MOSFET, but may also be a semiconductor device having other structures.

The switching device 505 is connected between the gate of the main switching device 3 and the negative terminal 102. The switching device 505 is a switching device for off control, and when the gate of the main switching device 3 is electrically connected to the negative terminal 102, the output signal Vout for the gate terminal of the main switching device 3 is set as the low level, and the main switching device 3 is turned off. The switching device 505 may be turned on when the drive signal Vin is at the high level. It should be noted that according to the present embodiment, as one example, the switching device 505 is an N type MOSFET, but may also be a semiconductor device having other structures.

[1.1.2(2). Sensing unit 51]

The sensing unit 51 is configured to output a short circuit sensing signal in response to sensing of short circuit of the main switching device 3. The sensing unit 51 may sense the short circuit of the main switching device 3 in a turn-on period of the main switching device 3 by the switching device 504 for on control, but in addition to this, may also sense the short circuit in other periods. The sensing unit 51 may sense occurrence of the short circuit in response to a state where a parameter according to a current flowing in the main switching device 3 exceeds a first threshold. The sensing unit 51 has a measurement unit 510 and a determination unit 515.

[1.1.2(2-1). Measurement Unit 510]

The measurement unit 510 is configured to measure a parameter according to a current flowing in the main switching device 3. The current flowing in the main switching device 3 may be an instantaneous value of the current flowing in the main switching device 3.

According to the present embodiment, as one example, the measurement unit 510 may have two resistances 511 and 512 connected in series between the sense emitter terminal of the main switching device 3 (according to the present embodiment, as one example, the emitter terminal of the switching device 30) and the ground. The measurement unit 510 may supply a voltage (also referred to as a sense voltage) Vc1 which is detected in response to flowing of the sense emitter current in the resistance 512 on the ground side, to the determination unit 515 as the parameter according to the current flowing in the main switching device 3.

[1.1.2(2-2). Determination Unit 515]

The determination unit 515 is configured to compare the parameter (according to the present embodiment, as one example, the sense voltage Vc1) which is measured by the measurement unit 510 with the first threshold. The determination unit 515 may sense occurrence of the short circuit in the main switching device 3 in response to a state where the sense voltage Vc1 exceeds the first threshold. According to the present embodiment, as one example, the determination unit 515 is a comparator, in which a connection point between the resistances 511 and 512 of the measurement unit 510 is connected to a non-inverting input terminal of the determination unit 515, and a first reference potential Vref1 is connected to an inverting input terminal of the determination unit 515.

The first reference potential Vref1 is one example of the first threshold, and is used as a determination threshold of the short circuit. The first reference potential Vref1 may be higher than the sense voltage Vc1 in a case where the main switching device 3 is not in a short circuit state, and may be lower than the sense voltage Vc1 in a case where the main switching device 3 is put into the short circuit state. With this configuration, an output signal V1 of the determination unit 515 turns to the high level in response to a state where the main switching device 3 is put into the short circuit state, and serves as the short circuit sensing signal indicating that the short circuit has been sensed. The determination unit 515 may supply the output signal V1 to the protection operation control unit 6.

It should be noted that the sense voltage Vc1 transiently increases in the turn-on period of the main switching device 3. The first reference potential Vref1 may be lower than a peak potential of the sense voltage Vc1 in the turn-on period of the main switching device 3. With this configuration, in the turn-on period of the main switching device 3, when the current flowing in the main switching device 3 transiently increases, short circuit may be falsely sensed.

[1.1.2(3). Protection Operation Control Unit 6]

The protection operation control unit 6 is connected to an output terminal of the sensing unit 51. When the sensing unit 51 senses short circuit, the protection operation control unit 6 may cause the protection unit 7 to execute a short circuit protection operation. The protection operation control unit 6 has a voltage control unit 60, an on-side switch control unit 61, and a cutoff control unit 62, all of which are connected to the output terminal of the sensing unit 51.

[1.1.2(3-1). Voltage Control Unit 60]

The voltage control unit 60 is configured to output, to the protection unit 7, an instruction signal of the short circuit protection operation for restricting a level of the signal Vout supplied to the gate terminal of the main switching device 3. According to the present embodiment, as one example, the voltage control unit 60 may supply the output signal V1 output from the sensing unit 51 to the protection unit 7 as an on/off signal for an operational amplifier 725 which will be described below.

[1.1.2(3-2). On-Side Switch Control Unit 61]

The on-side switch control unit 61 is configured to output, to the protection unit 7, an instruction signal (also referred to as a first instruction signal) of the short circuit protection operation for turning off the switching device 504 for on control for the main switching device 3.

The on-side switch control unit 61 outputs the first instruction signal at delayed timing relative to the short circuit sensing signal (according to the present embodiment, as one example, the output signal V1 at the high level). For example, the on-side switch control unit 61 may output the first instruction signal at delayed timing relative to rise of the short circuit sensing signal. The on-side switch control unit 61 according to the present embodiment may output the first instruction signal in response to continuation of the short circuit sensing signal beyond a first reference time period.

Herein, the output of the instruction signal in response to the continuation of the short circuit sensing signal beyond a reference time period (as one example, the first reference time period) may be output of the instruction signal during a period in which the short circuit sensing signal continues beyond the reference time period, and in other words, in a case where the short circuit sensing signal continues beyond the reference time period, the output may be continuous output of the instruction signal unless the output of the short circuit sensing signal is ended.

The first reference time period may be preset to any time duration. For example, the first reference time period may be a time period from rise timing of the short circuit sensing signal until timing at which an incident after the rise of the short circuit sensing signal occurs.

As one example, the first reference time period may be a time period from rise timing of the short circuit sensing signal in a case where the main switching device 3 is turned on in a state where the short circuit does not occur until fall timing. The fall timing of the short circuit sensing signal may be timing at which the sense voltage Vc1 falls below the first reference potential Vref1.

In addition, the first reference time period may be a time period from rise timing of the short circuit sensing signal in a case where the main switching device 3 is turned on in a state where the short circuit does not occur until end timing of a Miller period. The Miller period may be a period in which change of a gate-source voltage is flat as a result after electric charges flowing to the gate of the main switching device 3 in the turn-on period are mainly used for charging a gate-drain capacitance of the main switching device 3. The end timing of the Miller period may be timing at which after the gate-source voltage turns to be flat, the rise starts.

The on-side switch control unit 61 has a delay unit 610, a logical AND operation unit 611, and a buffer circuit unit 612.

The delay unit 610 is connected to the output terminal of the sensing unit 51, and is configured to delay the short circuit sensing signal included in the output signal V1 of the sensing unit 51 by the first reference time period. According to the present embodiment, as one example, the delay unit 610 may be an RC integration circuit. The delay unit 610 may supply the delayed short circuit sensing signal to the logical AND operation unit 611.

The logical AND operation unit 611 is connected to the output terminal of the sensing unit 51 and an output terminal of the delay unit 610, and is configured to obtain a logical product of the short circuit sensing signal and the short circuit sensing signal delayed by the delay unit 610. According to the present embodiment, as one example, the logical AND operation unit 611 may be a NAND gate, and may invert and output an operation result of the logical product. With this configuration, the output signal of the logical AND operation unit 611 turns to the low level in response to the continuation of the short circuit sensing signal beyond the first reference time period. The logical AND operation unit 611 may supply the output signal to the buffer circuit unit 612.

The buffer circuit unit 612 is connected to an output terminal of the logical AND operation unit 611, and is configured to correct a signal intensity of the output signal of the logical AND operation unit 611. According to the present embodiment, as one example, the buffer circuit unit 612 is a NOT gate, and outputs an output signal V2 indicating double negation of the operation result of the logical product in the logical AND operation unit 611 by cooperating with a NOT gate part in the NAND gate as the logical AND operation unit 611. A signal at the high level which is included in the output signal V2 may be one example of the first instruction signal for an instruction to turn off the switching device 504 for on control, and the buffer circuit unit 612 may output the first instruction signal by outputting the output signal V2 at the high level. The buffer circuit unit 612 may supply the output signal V2 to the protection unit 7.

[1.1.2(3-3). Cutoff Control Unit 62]

The cutoff control unit 62 is configured to output, to the protection unit 7, an instruction signal (also referred to as a second instruction signal) for a short circuit protection operation to turn off the main switching device 3 and the switching device 505 for off control irrespective of the drive signal Vin. The cutoff control unit 62 may output the second instruction signal in response to continuation of the short circuit sensing signal beyond a second reference time period. According to the present embodiment, as one example, the second instruction signal may be a signal at the low level. It should be noted that the cutoff control unit 62 may have a configuration similar to the on-side switch control unit 61. In addition, for simplification in FIG. 1, an illustration of the second instruction signal for the switching device 505 for off control is omitted.

The second reference time period may be preset to a time duration longer than the first reference time period. The second reference time period may be a time period from rise timing of the short circuit sensing signal until any timing before device destruction occurs in a case where the main switching device 3 is in a short circuit state. As one example, the second reference time period may be 1 µs.

[1.1.3. Protection Unit 7]

The protection unit 7 is configured to perform various short circuit protection operations according to a signal from the protection operation control unit 6. The protection unit 7 has an OR gate 70, a switching device 71, and a clamp unit 72.

[1.1.3(1). OR Gate 70]

The OR gate 70 is connected to the input terminal 103 and the on-side switch control unit 61 of the protection operation control unit 6. The OR gate 70 may obtain a logical sum of the drive signal Vin and the first instruction signal included in the output signal V2 from the protection operation control unit 6. The OR gate 70 may supply an operation result to the switching device 504 for on control of the main switching device 3. With this configuration, the switching device 504 is turned off in response to a state where the drive signal Vin turns to the high level, and is also turned off in response to a state where the output signal V2 turns to the high level, that is, in response to the output of the first instruction signal.

[1.1.3(2). Switching Device 71]

The switching device 71 is connected between the gate of the main switching device 3 and the negative terminal 102 in parallel with the switching device 505 for off control. The switching device 71 may turn off the main switching device 3 by electrically connecting the gate of the main switching device 3 to the negative terminal 102. A switching speed of the switching device 71 may be lower than a switching speed of the switching device 505.

The switching device 71 is one example of a cutoff unit, and may turn off the main switching device 3 in response to the continuation of the short circuit sensing signal beyond the second reference time period. According to the present embodiment, as one example, the switching device 71 may turn off the main switching device 3 in response to supply of the second instruction signal at the low level from the cutoff control unit 62. It should be noted that according to the present embodiment, as one example, the switching device 71 is a P type MOSFET, but may be a semiconductor device having other structures.

[1.1.3(3). Clamp Unit 72]

The clamp unit 72 is configured to clamp a gate voltage of the main switching device 3 to a reference voltage in response to the short circuit sensing signal. The reference voltage may be a voltage lower than the gate voltage in a case where the main switching device 3 is in a steady on state. The clamp unit 72 has resistances 721 and 722 and the operational amplifier 725.

The resistances 721 and 722 are connected in series between the gate of the main switching device 3 and the negative terminal. A midpoint of the resistances 721 and 722 may be connected to an inverting input terminal of the operational amplifier 725. With this configuration, a voltage according to a gate voltage of the main switching device 3 is supplied to the inverting input terminal.

In the operational amplifier 725, the reference voltage is connected to a non-inverting input terminal, and the gate of the main switching device 3 is connected to the output terminal. With this configuration, the operational amplifier 725 and the resistances 721 and 722 may cooperate to clamp the gate voltage to the reference voltage described above. The operational amplifier 725 may be put into the on state by an on signal output from the voltage control unit 60, and put into the off state by an off signal.

In accordance with the switching apparatus 1 described above, since the switching device 504 for on control is turned off after the sensing of the short circuit, the timing of turn-off of the switching device 504 is delayed as compared with a case where the switching device 504 is turned off simultaneously with the short circuit sensing. Therefore, timing at which the charging to the gate of the main switching device 3 is suspended can be delayed in a case where the current flowing in the main switching device 3 in the turn-on period of the main switching device 3 transiently increases, which is falsely sensed as short circuit. Thus, delay to turn on the main switching device 3 due to the suspension of the gate charging can be avoided.

In addition, since the first instruction signal for turning off the switching device 504 is output in response to the continuation of the short circuit sensing signal beyond the first reference time period, in a case where the current flowing in the main switching device 3 in the turn-on period transiently increases to falsely sense short circuit, the output of the first instruction signal is started later than start timing of the false sensing, and the output of the first instruction signal is ended at end timing of the false sensing. Therefore, an output period of the first instruction signal is shortened as compared with a case where the first instruction signal is output during a period of the false sensing of the short circuit. For this reason, it is possible to shorten a period in which the gate charging of the main switching device 3 is suspended due to turn-off of the switching device 504 for on control, and turn-on of the main switching device 3 can be expedited.

In addition, since the logical product of the short circuit sensing signal and the signal obtained by delaying the short circuit sensing signal by the first reference time period is obtained in the protection operation control unit 6, the first instruction signal can be output in response to the continuation of the short circuit sensing signal beyond the first reference time period.

Moreover, since the gate voltage of the main switching device 3 is maintained at the reference voltage lower than the steady on state voltage in response to the short circuit sensing signal, the current flowing in the main switching device 3 can be reduced to avoid device destruction.

In addition, since the main switching device 3 is turned off in response to the continuation of the short circuit sensing signal beyond the second reference time period, the device destruction by the short circuit can be further reliably avoided.

[1.2 Operation Waveform]

Figure 2:
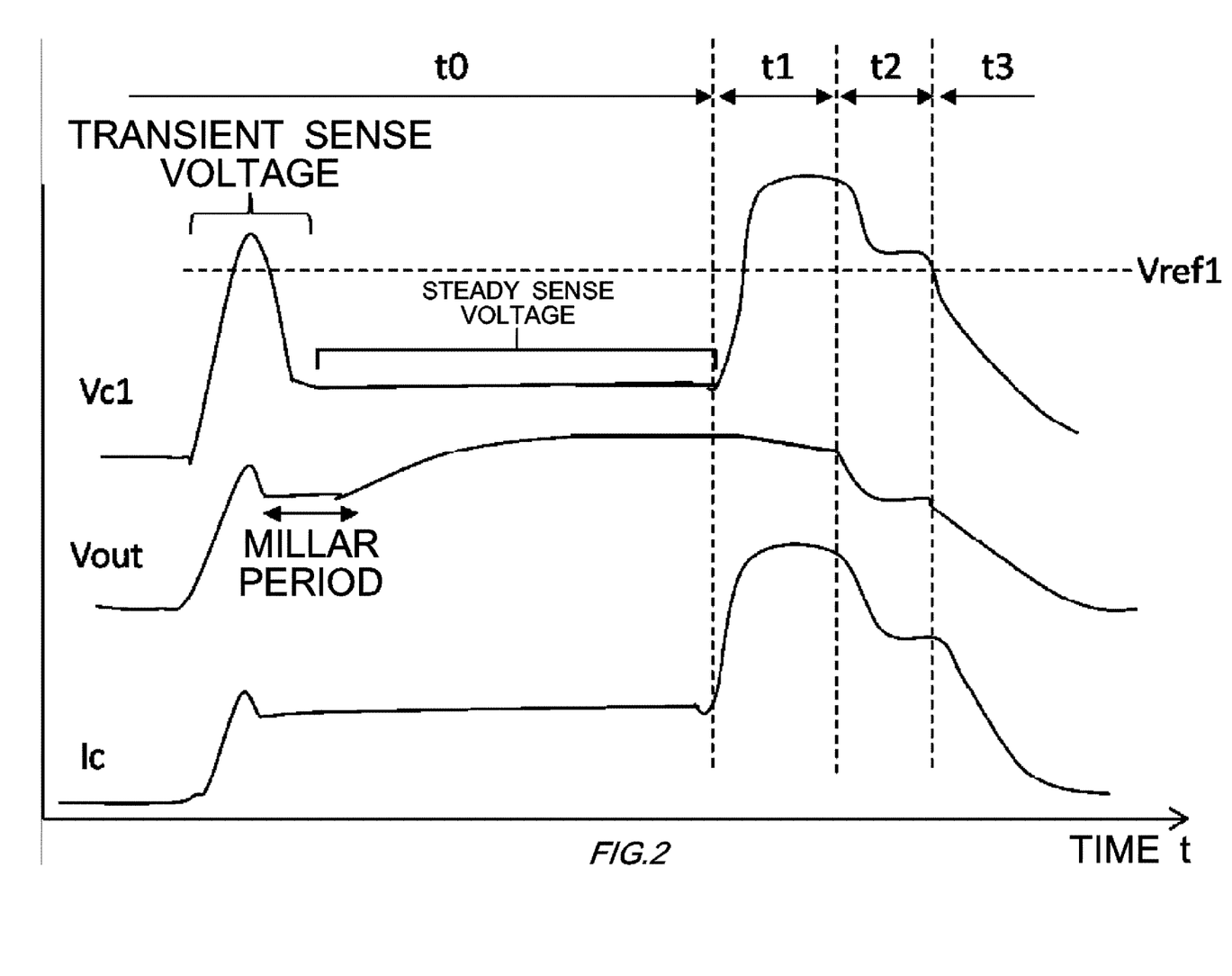
FIG. 2 illustrates an operation waveform of the switching apparatus 1.

FIG. 2 illustrates an operation waveform of the switching apparatus 1. This drawing illustrates, as one example, after the main switching device 3 is turned on in a state where short circuit does not occur, the sense voltage Vc1, the gate voltage Vout, and a collector current Ic in a case where short circuit has then occurred. A vertical axis in the drawing represents a voltage or a current, and a horizontal axis represents time. It should be noted that the collector current Ic may be a current flowing in the main switching device 3.

First, when the main switching device 3 is turned on in a state where short circuit does not occur in a period t0, the sense voltage Vc1 indicates a voltage (also referred to as a transient sense voltage) of a transiently rising and falling waveform, and is then maintained at a voltage (also referred to as a steady sense voltage) in the steady on state.

Since the transient sense voltage temporarily exceeds the first reference voltage Vref1, the sensing unit 51 falsely senses short circuit of the main switching device 3 to output the short circuit sensing signal. Thus, an operation for clamping the gate voltage Vout to the reference voltage is performed by the clamp unit 72. It should be noted however that the first instruction signal is not output from the on-side switch control unit 61 at a start time point of this operation, and since the switching device 504 for on control is maintained in the on state and the charging to the gate of the main switching device 3 continues, the gate voltage gradually rises. Next, when the short circuit sensing signal continues beyond the first reference time period, as a result of the output of the first instruction signal by the on-side switch control unit 61, the switching device 504 for on control is turned off to suspend the charging to the gate of the main switching device 3. Thus, the gate voltage Vout is maintained at the reference voltage by the clamp unit 72. In addition, in a case where a Miller period has already started, the Miller period is extended (not illustrated). Next, when the transient sense voltage of the sense voltage Vc1 falls below the reference voltage Vref1 to end the output of the short circuit sensing signal, the output of the first instruction signal is ended. Thus, the switching device 504 for on control is turned on, and the charging to the gate of the main switching device 3 is resumed, so that turn-on of the main switching device 3 is completed.

Subsequently, when short circuit occurs in the main switching device 3 in a period t1, the collector current Ic and the sense voltage Vc1 suddenly rise. Next, when the sense voltage Vc1 exceeds the first reference voltage Vref1, the sensing unit 51 senses the short circuit of the main switching device 3 to output the short circuit sensing signal. Thus, similarly as in the period t0, the clamp unit 72 performs the operation for clamping the gate voltage Vout to the reference voltage and an operation for turning off the switching device 504 for on control. Thus, in a period t2, the gate voltage Vout is maintained at the reference voltage. Then, when the short circuit sensing signal continues beyond the second reference time period, as a result of the output of the second instruction signal by the cutoff control unit 62 in a period t3, the switching device 505 for off control is turned off, and also the main switching device 3 is turned off by the switching device 71.

2. Second Embodiment

Figure 3:
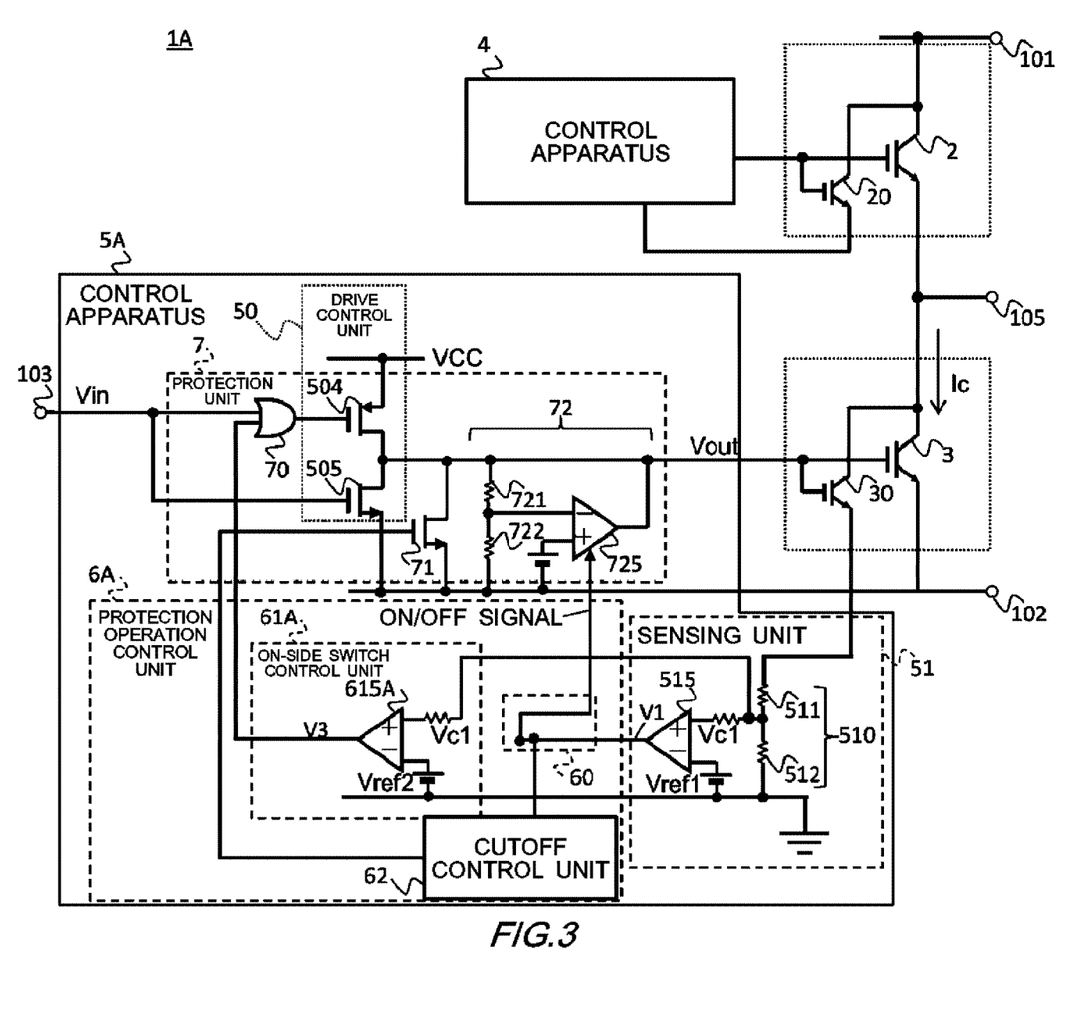
FIG. 3 illustrates a switching apparatus 1A according to a second embodiment.

FIG. 3 illustrates a switching apparatus 1A according to a second embodiment. A control apparatus 5A of the switching apparatus 1A includes a protection operation control unit 6A, and the protection operation control unit 6A has an on-side switch control unit 61A. It should be noted that according to the present embodiment and other embodiments which will be described below, a component that is substantially the same as that of the switching apparatus 1 illustrated in FIG. 1 is denoted by the same reference sign, and a description of such a component will be omitted.

The on-side switch control unit 61A is configured to output the first instruction signal of short circuit protection operation for turning off the switching device 504 for on control to the protection unit 7 at delayed timing relative to the short circuit sensing signal (according to the present embodiment, as one example, the output signal V1 at the high level). The on-side switch control unit 61A may output the first instruction signal at delayed timing relative to the rise of the short circuit sensing signal. The on-side switch control unit 61A according to the present embodiment may output the first instruction signal in response to a state where the parameter according to the current flowing in the main switching device 3 exceeds a second threshold higher than the first threshold for the short circuit sensing in the sensing unit 51. The on-side switch control unit 61A has a determination unit 615A.

The determination unit 615A is configured to compare the parameter (according to the present embodiment, as one example, the sense voltage Vc1) which is measured by the measurement unit 510 of the sensing unit 51 with the second threshold. The determination unit 615A may sense the delayed timing relative to the short circuit sensing signal in response to a state where the sense voltage Vc1 exceeds the second threshold. According to the present embodiment, as one example, the determination unit 615A is a comparator, in which the connection point between the resistances 511 and 512 of the measurement unit 510 is connected to a non-inverting input terminal of the determination unit 615A, and a second reference potential Vref2 is connected to an inverting input terminal of the determination unit 615A.

The second reference potential Vref2 is one example of the second threshold, and is set to be higher than the first reference potential Vref1. The second reference potential Vref2 may be lower than the sense voltage Vc1 in a case where the main switching device 3 is put into the short circuit state. Thus, in response to a state where the main switching device 3 is put into the short circuit state, after the output signal V1 of the determination unit 515 in the sensing unit 51 turns to the high level, an output signal V3 of the determination unit 615A turns to the high level, and it is indicated that delayed timing relative to the short circuit sensing signal is sensed.

The determination unit 615A may supply the output signal V3 to the protection unit 7. The signal at the high level which is included in the output signal V3 is one example of the first instruction signal, and may instruct turn-off of the switching device 504 for on control.

In accordance with the switching apparatus 1A described above, since the first instruction signal for turning off the switching device 504 is output in response to a state where the parameter according to the current flowing the main switching device 3 exceeds the second threshold higher than the first threshold for the short circuit sensing, in a case where the current flowing in the main switching device 3 in the turn-on period transiently increases to falsely sense short circuit, the output of the instruction signal is started later than the start timing of the false sensing of the short circuit, and the output of the first instruction signal is ended earlier than the end timing of the false sensing. Therefore, as compared with a case where the first instruction signal is output over a period in which the short circuit is falsely sensed, the output period of the first instruction signal is shortened. For this reason, the period in which the gate charging of the main switching device 3 is suspended due to turn-off of the switching device 504 for on control can be shortened to expedite turn-on of the main switching device 3.

3. Third Embodiment

Figure 4:
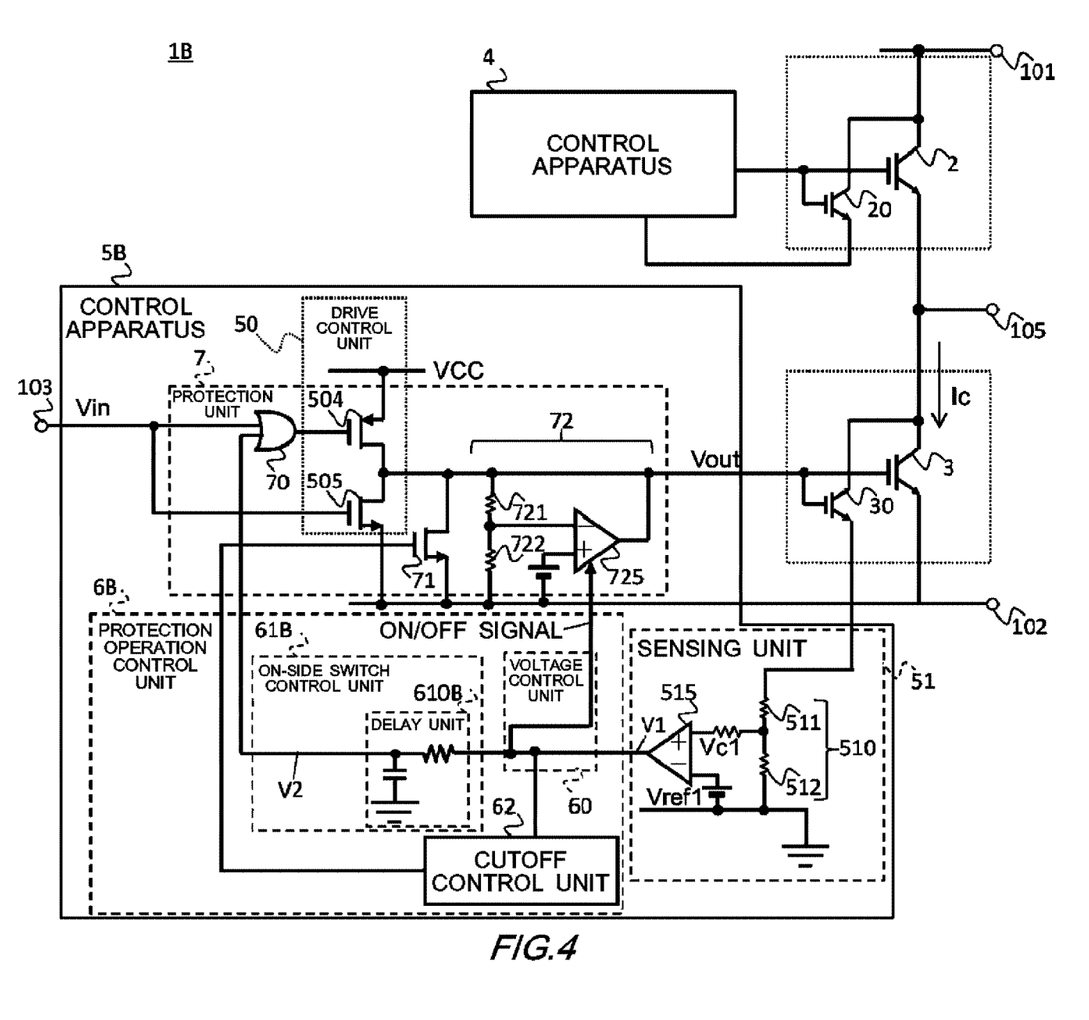
FIG. 4 illustrates a switching apparatus 1B according to a third embodiment.

FIG. 4 illustrates a switching apparatus 1B according to a third embodiment. A control apparatus 5B of the switching apparatus 1B includes a protection operation control unit 6B, and the protection operation control unit 6B has an on-side switch control unit 61B.

The on-side switch control unit 61B is configured to output the first instruction signal of the short circuit protection operation for turning off the switching device 504 for on control to the protection unit 7 at delayed timing relative to the short circuit sensing signal (according to the present embodiment, as one example, the output signal V1 at the high level). The on-side switch control unit 61B may delay the short circuit sensing signal to timing for completion of turn-on of the main switching device 3 or later to be output as the first instruction signal. The on-side switch control unit 61B according to the present embodiment has a delay unit 610B.

The delay unit 610B is connected to the output terminal of the sensing unit 51, and is configured to delay the short circuit sensing signal included in the output signal V1 of the sensing unit 51 to timing for the completion of turn-on of the main switching device 3 or later. According to the present embodiment, as one example, the delay unit 610 may be an RC integration circuit.

The delay unit 610B may delay the short circuit sensing signal by a third reference time period. The third reference time period may be preset to any time duration. For example, the third reference time period may be a time period from rise timing of the short circuit sensing signal until timing for the completion of turn-on of the main switching device 3. The completion of turn-on of the main switching device 3 may be a state where the main switching device 3 is put into the steady on state, and for example, may be a state where the sense voltage Vc1 turns to the steady sense voltage in the turn-on period. As one example, the third reference time period may be 50 to 100 ns.

The delay unit 610B may supply the output signal V3 to the protection unit 7. A signal at the high level which is included in the output signal V3 may be one example of the first instruction signal for instructing turn-off of the switching device 504 for on control, and the delay unit 610B may output the first instruction signal by outputting the output signal V3 at the high level.

In accordance with the switching apparatus 1B described above, since the short circuit sensing signal is delayed to timing for the completion of turn-on of the main switching device 3 or later to be output as the first instruction signal for turning off the switching device 504, turn-on of the main switching device 3 is already completed at the timing at which the first instruction signal is output. Therefore, in a case where the current flowing in the main switching device 3 in the turn-on period transiently increases to falsely sense short circuit, it is possible to avoid suspension of the gate charging of the main switching device 3 by turn-off of the switching device 504 for on control to expedite turn-on of the main switching device 3.

4. Modified Example

It should be noted that according to the above described embodiments, the description has been provided where the protection operation control unit 6, 6A, and 6B have the voltage control unit 60 and the cutoff control unit 62, but a configuration may also be adopted where the protection operation control unit 6, 6A, and 6B do not have at least one of these.

In addition, the description has been provided where the voltage detected in response to a state where the sense emitter current of the main switching device 3 flows in the resistances 511 and 512 is used as the parameter according to the current flowing in the main switching device 3, but other parameters such as a voltage detected in response to a state where an emitter current of the main switching device 3 flows in the resistance may also be used.

While the embodiments of the present invention have been described, the technical scope of the present invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the present invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

1: switching apparatus
2: main switching device
3: main switching device
4: control apparatus
5: control apparatus
6: protection operation control unit
7: protection unit
20: switching device
30: switching device
50: drive control unit
51: sensing unit
60: voltage control unit
61: on-side switch control unit
62: cutoff control unit
70: OR gate
71: switching device
72: clamp unit
101: positive terminal
102: negative terminal
103: input terminal
105: power supply output terminal
504: switching device
505: switching device
510: measurement unit
511: resistance
512: resistance
515: determination unit
610: delay unit
611: logical AND operation unit
612: buffer circuit unit
721: resistance
722: resistance
725: operational amplifier

What is claimed is:

1. A control apparatus comprising:
a sensing unit configured to output a short circuit sensing signal in response to sensing, in a turn-on period of a main switching device by a switching device for on control, of short circuit of the main switching device;
a protection operation control unit configured to output an instruction signal of a short circuit protection operation at delayed timing relative to the short circuit sensing signal; and
a protection unit configured to turn off the switching device for on control in response to the instruction signal,
wherein the protection operation control unit is configured to delay the short circuit sensing signal to timing at which turn-on of the main switching device is completed or later to be output as the instruction signal,
wherein the sensing unit is configured to output the short circuit sensing signal in response to a state where a parameter according to a current flowing in the main switching device exceeds a first threshold, and
wherein the protection operation control unit is configured to output the instruction signal in response to a state where the parameter exceeds a second threshold higher than the first threshold.

2. The control apparatus according to claim 1, wherein the protection operation control unit is configured to output the instruction signal in response to continuation of the short circuit sensing signal beyond a first reference time period.

3. The control apparatus according to claim 2, wherein the protection operation control unit has
a delay unit configured to delay the short circuit sensing signal by the first reference time period, and
a logical AND operation unit configured to obtain a logical product of the short circuit sensing signal and the short circuit sensing signal delayed by the delay unit.

4. The control apparatus according to claim 3, wherein the protection unit has a clamp unit configured to clamp a gate voltage of the main switching device to a reference voltage lower than a gate voltage in a case where the main switching device is in a steady on state in response to the short circuit sensing signal.

5. The control apparatus according to claim 3, wherein the protection unit has a cutoff unit configured to turn off the main switching device in response to continuation of the short circuit sensing signal beyond a second reference time period.

6. The control apparatus according to claim 3, further comprising:
a drive control unit configured to perform drive control on the main switching device according to a drive signal.

7. The control apparatus according to claim 2, wherein the protection unit has a clamp unit configured to clamp a gate voltage of the main switching device to a reference voltage lower than a gate voltage in a case where the main switching device is in a steady on state in response to the short circuit sensing signal.

8. The control apparatus according to claim 2, wherein the protection unit has a cutoff unit configured to turn off the main switching device in response to continuation of the short circuit sensing signal beyond a second reference time period.

9. The control apparatus according to claim 2, further comprising:
a drive control unit configured to perform drive control on the main switching device according to a drive signal.

10. The control apparatus according to claim 1, wherein the protection unit has a clamp unit configured to clamp a gate voltage of the main switching device to a reference voltage lower than a gate voltage in a case where the main switching device is in a steady on state in response to the short circuit sensing signal.

11. The control apparatus according to claim 1, wherein the protection unit has a cutoff unit configured to turn off the main switching device in response to continuation of the short circuit sensing signal beyond a second reference time period.

12. The control apparatus according to claim 1, further comprising:
a drive control unit configured to perform drive control on the main switching device according to a drive signal.

13. A switching apparatus comprising:
the control apparatus according to claim 12, wherein drive control of the main switching device according to claim 12 is performed by the drive control unit.

* * * * *